United States Patent [19]

Herbort

[11] Patent Number: 5,110,564
[45] Date of Patent: May 5, 1992

[54] DEVICE FOR ACCOMMODATING CATALYST ESPECIALLY IN THE PRODUCTION OF SYNTHESIS GAS

[75] Inventor: Hans-Joachim Herbort, Froendenberg, Fed. Rep. of Germany

[73] Assignee: Uhde GmbH, Dortmund, Fed. Rep. of Germany

[21] Appl. No.: 342,983

[22] Filed: Apr. 24, 1989

[30] Foreign Application Priority Data

Apr. 23, 1988 [DE] Fed. Rep. of Germany ....... 3813863

[51] Int. Cl.⁵ .............................................. B01J 8/06
[52] U.S. Cl. .................................. 422/197; 422/191; 422/193; 422/196
[58] Field of Search ............... 422/193, 191, 192, 196, 422/197

[56] References Cited

U.S. PATENT DOCUMENTS

| Re. 24,311 | 5/1957 | Mader | 422/197 X |
|---|---|---|---|
| 1,920,632 | 8/1933 | Daniels | 422/197 |
| 2,029,604 | 2/1936 | Bayer et al. | 422/197 X |
| 2,579,843 | 12/1951 | Mader | 422/197 X |
| 3,516,800 | 6/1970 | Yamamoto et al. | 422/197 X |
| 4,731,098 | 3/1988 | Marsch | 422/197 X |
| 4,741,885 | 5/1988 | Herbort et al. | 422/197 |
| 4,810,472 | 3/1989 | Andrew et al. | 422/197 |
| 4,830,091 | 5/1989 | Dierke et al. | 422/197 X |

Primary Examiner—Robert J. Warden
Assistant Examiner—Amalia Santiago
Attorney, Agent, or Firm—Toren, McGeady & Associates

[57] ABSTRACT

A device for accommodating catalyst in particular a primary and a secondary catalyst in the production of synthesis gas in an auto-thermal reformer has the primary catalyst being accommodated in a plurality of catalyst tubes, providing an optimal, and above all, compact design, guaranteeing sustained optimum gas flow and expansion properties in the context of an overall exothermic reaction. This is achieved in that each individual primary catalyst tube (11) correlates with an individual secondary catalyst and that the primary catalyst tube (11) continues in the form of a narrow feed tube (11a) that extends through the respective secondary catalyst (13).

15 Claims, 4 Drawing Sheets

DEVICE FOR ACCOMMODATING CATALYST ESPECIALLY IN THE PRODUCTION OF SYNTHESIS GAS

BACKGROUND OF THE INVENTION

The invention relates to a device for accommodating catalyst, in particular primary and secondary catalyst for the production of synthesis gas in an autothermal reformer, the primary catalyst being accommodated in a plurality of parallel catalyst tubes.

There exist already a variety of similar devices, particularly in the case of autothermal reformers for synthesis gas production, which incorporate primary and secondary catalysts arranged in such a way as to control and utilize the energy (i.e. heat) arising from the reactions, which are generally of an overall exothermic nature. DE-OS 36 05 811 and DE-OS 32 44 252 may be cited as examples for the arrangement of, in particular, primary catalyst tubes. DE-OS 35 32 413 makes provision for the primary catalyst tube bundle to be surrounded with packing material, through which the synthesis gas flows, and which may be further adapted to function as a secondary catalyst.

Alternative gas flow patterns and secondary reformer configurations are to be found in GB-A 2 153 382 and EP-A 0 242 199.

It has been found that known devices are in need of improvement in certain important respects, in particular as regards the utilization efficiency of the catalysts, the appropriate mode of support for the secondary catalyst, optimization of the synthesis gas channels, the density of the tube bundle, the overcoming of thermal distortions and improved sizing of installations equipped with appropriate accessories.

SUMMARY OF THE INVENTION

The purpose of the invention is thus to provide a solution guaranteeing consistently optimal gas flow and expansion properties in respect of the generally exothermic reactions, whilst maintaining the most compact possible design.

A device of the type described above fulfils this task in terms of the invention in that each individual primary catalyst tube is surrounded by a secondary catalyst and that said primary catalyst tube extends in the form of a narrow feed tube through the secondary catalyst.

By assigning a secondary catalyst to each primary catalyst tube within the tube bundle, it is possible for the secondary catalyst tube bundles to be very densely packed, thereby reducing the cross-sectional area typical for devices of this type. In addition to the concomitant design advantages, this also results in optimal gas flow through the secondary catalyst and overcomes the thermal expansion problems normally associated with devices in which the secondary catalyst is assigned to the primary reformer tubes en groupe.

The configuration specified in the claims may be realized in a number of modes without deviating from the essential principle of the invention. The feed tubes extending through the secondary catalyst may, for example, serve directly as carriers for the latter in cases where the catalyst takes the form of a coating on the outer surface of the tubes. The denser tube arrangement thus permitted results in an optimumally dense packing of the secondary catalyst as a whole.

Combined with, or instead of, this configuration, the invention provides for a jacket tube surrounding the primary catalyst tube at a given clearance for the return of the synthesis gas after it has passed through the secondary catalyst. This configuration results in an annular gap between between the primary catalyst tube and the jacket tube, which is utilized for the return flow of the synthesis gas.

In order to promote optimum gas flow in the secondary catalyst, an at least partially perforated gas duct, which connects with the annular gap between the primary catalyst tube and the jacket tube, is located between the secondary catalyst tube and the guide tube for the return of the synthesis gas after it has passed through the secondary catalyst. Said additional gas duct creates a radial flow component in the gas stream through the secondary catalyst, thereby reducing both pressure drop in the secondary catalyst and heat loss of the gas in the secondary catalyst to that in the feed tubes.

One embodiment of the invention is characterized in that the jacket tube surrounding the primary catalyst at a certain clearance extends beyond the primary catalyst and provides accommodation for the respective secondary catalyst. This configuration has particular design advantages in that an additional function is assigned to the already existent jacket tube, i.e. in that it provides said accommodation for the secondary catalyst.

It is expedient for inlet orifices for the synthesis gas to be provided in the region of the free end of the jacket tube surrounding the secondary catalyst. These may be located directly in the front face itself and/or in the tube shell in the vicinity of the front face.

An alternative embodiment of the invention is characterized in that a secondary catalyst tube with inlet openings for the synthesis gas is located at the open end of the jacket tube to accommodate the secondary catalyst. It is thus possible to control the volume of the secondary catalyst according to requirements by varying the dimensions of said secondary catalyst tube independently of the jacket tube.

It is particularly expedient for the inlet openings at both ends of the secondary catalyst tube and the perforations in the gas duct to be located towards the center of the latter. This results in a division of the gas stream entering the secondary catalyst into two partial streams, thus effectively halving the velocity of flow for the same residence period in the catalyst and at the same time reducing pressure drop.

To increase the space available for the secondary catalyst, the diameter of the secondary catalyst tube can be so dimensioned as to be greater than that of the jacket tube.

It is further highly advantageous for the secondary catalyst tube to be detachably mounted on the jacket tube. The secondary catalyst can then be replaced by simple removal of the secondary catalyst tube with no further steps required.

It is expedient for a catalyst carrier for both the primary and secondary catalyst as well as screens to be provided, where each individual component, consisting of a jacket tube and a primary catalyst tube, can be fixed in a tubesheet so as to permit easy dismantling; or preferably suspended from a tubesheet, though other variants are possible within the scope of the claims. In other words, the components stipulated in the claims can be adapted to any configuration, whether standing or suspended.

A possible embodiment of the invention is described in greater detail below in relation to the accompanying diagrams:

DESCRIPTION OF THE PREFERRED EMBODIMENTS

Figure 1:
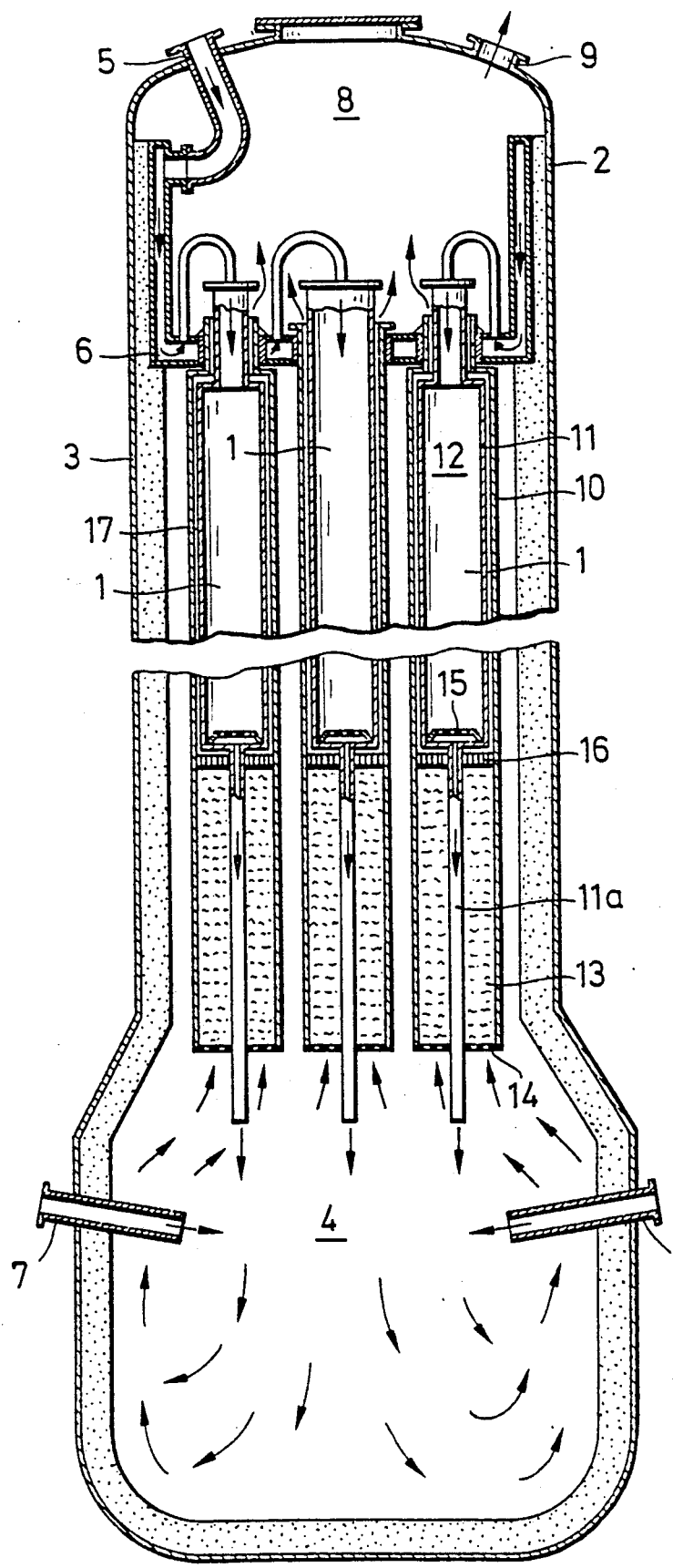
FIG. 1 shows a cross section through a synthesis gas reactor with suspended reformer tubes in simplified form.

A reactor or pressure vessel (2), equipped with the components designated collectively as (1) in the invention, comprises an upper reformer section (3) and a lower oxidation section (4), the reformer section consisting of a plurality of components (1) according to the invention, i.e. a tube bundle.

For the sake of completeness, the diagram also shows one of the two inlet nozzles (5) for feeding hydrocarbon-laden steam to the individual tubes via the hollow tubesheet (6).

The oxidation section (4) is equipped with feed pipes (7) for other fluids such as oxidation agents or further quantities of hydrocarbon-laden gas, etc. An outlet nozzle (9) for the synthesis gas can be seen in the region of the upper dome (8). The principal direction of flow is indicated by the small arrows, though is of no further relevance for the invention.

The components collectively designated as (1) in terms of the invention take the form of partly double-walled tubes with an outer jacket tube (10) extending effectively the full length of component (1) and an inner tube (11), extending part of the length of the reformer, which accommodates the primary catalyst (12) and, in the example shown, extends further as a narrow feed tube (11a).

The narrow tube section (11a) extends through a secondary catalyst (13) completely enclosed by jacket tube (10), the narrow feed tube (11a) extending beyond the length of jacket tube (10) into the oxidation chamber (4) below. The free or larger end (14) of the jacket tube (11) is provided with inlet orifices for the gas leaving the oxidation chamber and at the same time serves to accommodate the secondary catalyst.

At the point where the tube (11) surrounding the primary catalyst (12) narrows to form the narrow feed tube (11a), a catalyst carrier (13) in the form of a screen is provided to hold the primary catalyst in place. On the outside, but still within jacket tube (10), a perforated plate (16) is provided at this point, which, in the example shown, forms the upper limit of the secondary catalyst (13), in such a manner that the gas flowing through the secondary catalyst (13) can pass into the annular gap (17) between the jacket tube (10) and the primary catalyst tube (11) on its way via the tubesheet (6) to the vessel dome (8).

Figure 2:
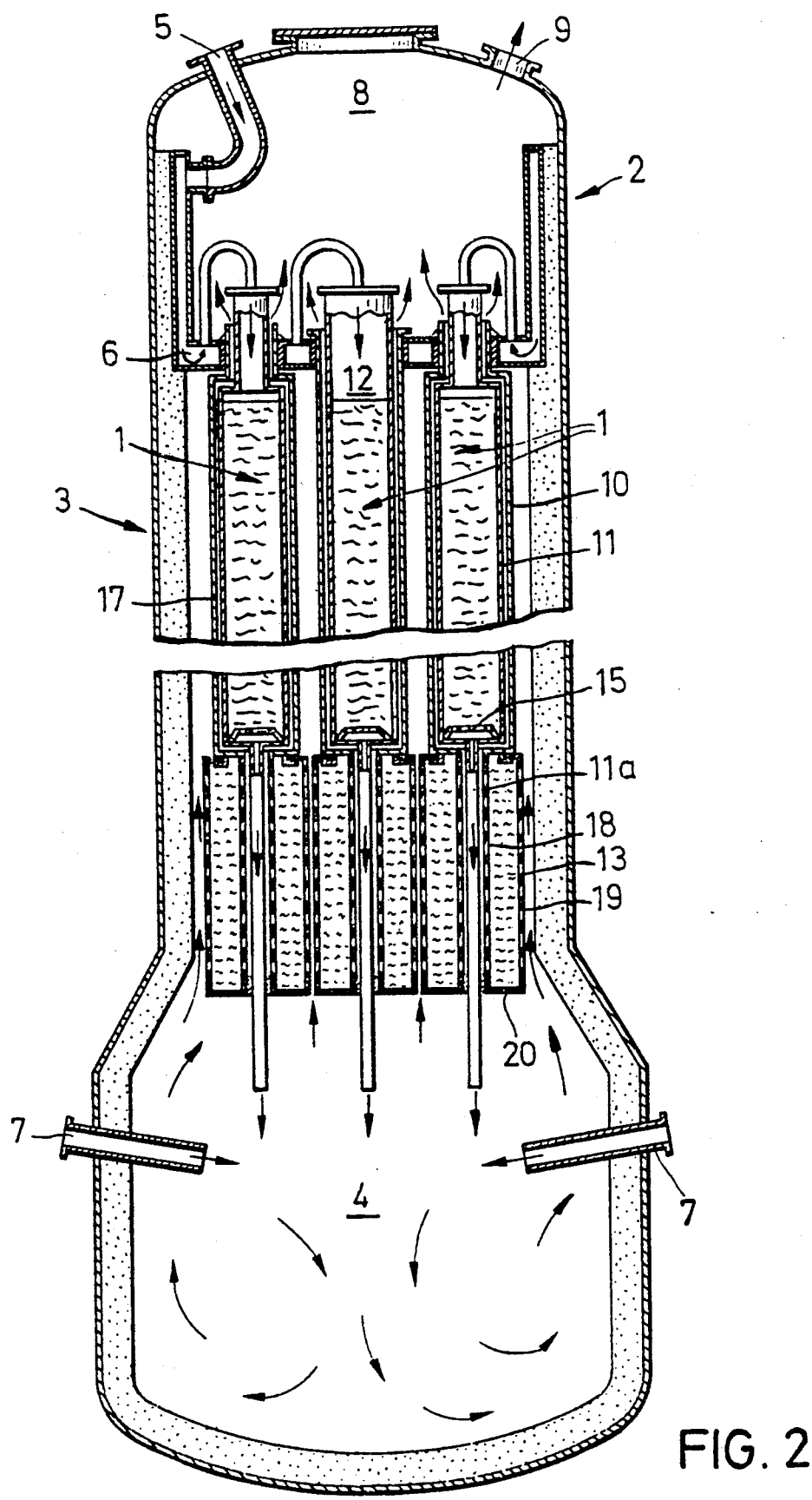
FIG. 2 also a cross-section through a synthesis gas reactor, shows a modified configuration.
Figure 3:
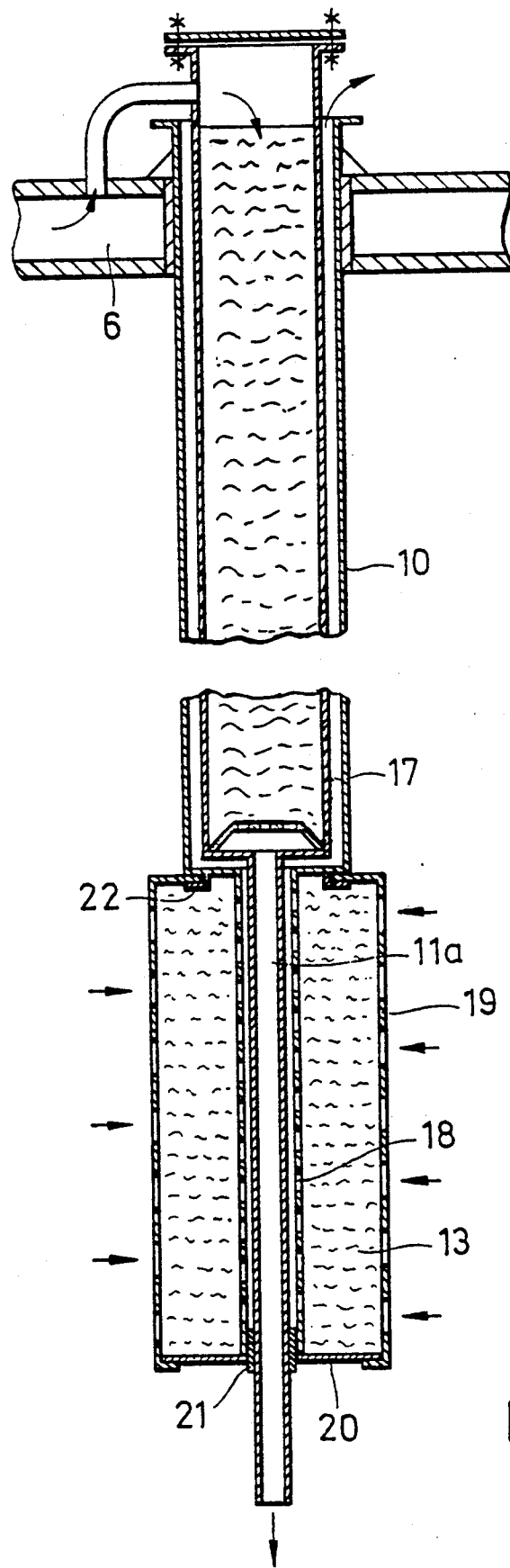
FIG. 3 shows a device (enlarged) for accommodating the catalyst in accordance with FIG. 2.

FIG. 2 shows a modified configuration of the invention. (Identical components are numbered as in FIG. 1.) Unlike that shown in FIG. 1, the jacket tube (10) surrounding the primary catalyst tube (11) does not extend beyond the latter, but is of approximately equal length. Instead, a secondary catalyst tube (19) is detachably mounted at the free end of the jacket tube (10) to accommodate the secondary catalyst, as shown in FIG. 3.

The secondary catalyst tube (19) is of greater diameter than the jacket tube (10), thereby providing a proportionate amount of space for the secondary catalyst (13). The open end of the secondary catalyst tube (19) is fitted with a detachable tray (20), which supports the catalyst (13). Said tray (20) might equally constitute an integral component of the secondary catalyst tube (19). A sealing element (21) is positioned in the annular gap between the tray (20) and the narrow feed tube (11a).

The detachable secondary catalyst tube (19) is attached to the jacket tube (10) by means of a separable connector (22) for easy removal when replacing the secondary catalyst (13) without having to dismantle the entire device. The secondary catalyst tube (19) is provided with inlet openings for the synthesis gas in its wall, through which the synthesis gas flows in a virtually radial pattern from the outside inwards to a perforated gas duct (18). This tube is located between the secondary catalyst (13) and the feed tube (11a) and connects with the annular gap (17) between the jacket tube (10) and the primary catalyst tube. The synthesis gas thus flows through the perforations in the gas duct (18) into the annular gap between the gas duct (18) and the feed tube (11a) and from thence into the annular gap (17).

Figure 4:
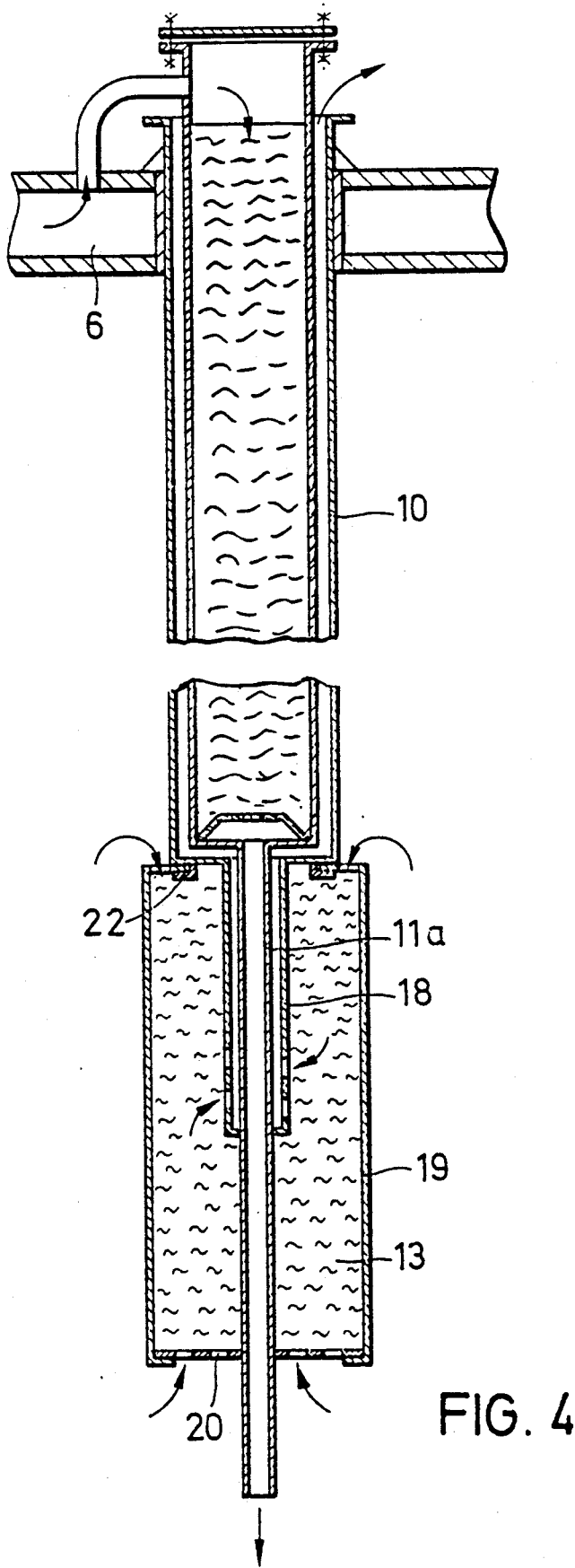
FIG. 4 shows a modified device for accommodating the catalyst.

FIG. 4 shows a further configuration of the devices (1). (The components are numbered as in FIGS. 2 and 3. In this embodiment, the secondary catalyst tube (19) has no inlet openings in its wall, but is provided with inlet openings in the tray (20) and at the connecting point (22) between the jacket tube (10) and the secondary catalyst tube (19). The gas duct (18) extends only to about the center of the secondary catalyst (13) and accommodates inlet openings only towards the center of the secondary catalyst (13).

In this configuration, the synthesis gas stream is divided into two equal partial streams, which enter the secondary catalyst (13) either through the tray (20) from below, or at the connection point (22) from above, and leave the catalyst via the perforations in the gas duct (18) thereby reducing both pressure drop and the velocity of flow.

Clearly the invention is not limited to the embodiments described above, but may be modified in a number of respects without detracting from its basic concept. The invention is thus not restricted, as pointed out above, to the suspended configuration of the components (1) described and depicted in the present document; nor to the type or configuration of the feed tubes (11a) within the individual secondary catalysts (13), etc. Alternatively, for example, tubes 18 and 19 may be replaced by wire mesh, or tube 19 omitted altogether if a catalyst is used that can be supported by tube 18.

I claim:

1. In a device for accommodating a primary catalyst and a secondary catalyst in the production of synthesis gas in an auto thermal reformer comprising an upright pressure vessel (2) having an upper end and a lower end, a plurality of laterally spaced upright primary catalyst tubes (11) containing the primary catalyst and secondary catalyst containing means located within said pressure vessel, wherein the improvement comprises means for containing and supporting the secondary catalyst from each said primary catalyst tube, and a narrow feed tube (11a) having a diameter smaller than said primary catalyst tubes (11) extending downwardly from and in open flow communication with a lower end of each said primary catalyst tube (11), and each of said narrow feed tubes (11a) extending through said means for supporting the secondary catalyst.

2. Device according to claim 1, wherein a jacket tube (10) laterally surrounds and is spaced outwardly from each said primary catalyst tube (11) forming an annular space for the return of synthesis gas after leaving the secondary catalyst (13).

3. Device according to claim 1, wherein said means includes a secondary catalyst tube (19) laterally enclosing said secondary catalyst below said primary catalyst tube, an at least partially perforated gas duct (18) located between and spaced from the secondary catalyst tube (19) and the feed tube (11a) for the return of the synthesis gas after passing through the secondary catalyst (13), said gas duct (18) is in flow communication with an annular gap (17) between the primary catalyst tube (11) and a jacket tube (10) laterally surrounding and spaced outwardly from each said primary catalyst tube.

4. Device according to claim 2, wherein said means comprises an extension of the jacket tube (10) surrounding each said primary catalyst tube (11) at a given clearance and extending downwardly below the primary catalyst to accommodate a portion of the secondary catalyst (13).

5. Device according to claim 4, wherein the jacket tube (10) accommodating the secondary catalyst (13) has an upper end and a lower end spaced downwardly from the upper end and the jacket tube (10) is provided with inlet openings for the synthesis gas at the lower end (14).

6. Device according to claim 2, wherein said means comprises a secondary catalyst tube (19) with inlet openings for the synthesis gas extending downwardly from a lower end of the jacket tube (10) and accommodates the secondary catalyst (13).

7. Device according to claim 6, wherein the secondary catalyst tube (19) has an upper end and a lower end, and a gas duct (18) is defined by said jacket tube and is located within and spaced inwardly from the secondary catalyst tube (19), inlet openings for the secondary catalyst tube (19) are located at the upper and lower ends thereof, and perforations in the jacket tube forming the gas duct (18) open radially therethrough.

8. Device according to claim 7, wherein the outside diameter of the secondary catalyst tube (19) is greater that the outside diameter of the jacket tube (10).

9. Device according to claim 6, wherein the secondary catalyst tube (19) is detachably mounted on the jacket tube (10).

10. Device according to claim 1, wherein a catalyst support (15) for the primary catalyst material is located at the lower end of the primary catalyst (12) and above the narrow feed tube (11a).

11. Device according to claim 4, wherein a secondary catalyst support (14) is located at a lower end of the jacket tube (10).

12. Device according to claim 2 wherein a screen (16) is provided between the secondary catalyst (13) and an annular gap (17) between the jacket tube (10) and the primary catalyst tube (11).

13. Device according to claim 2, wherein each said jacket tube (10) and each said primary catalyst tube (11) is detachable mounted in a tubesheet (6) in such a manner as to permit removal.

14. Device according to claim 2, wherein each said jacket tube (10) and each said primary catalyst tube (11) is suspended from a common tubesheet (6) within said pressure vessel (2).

15. Device according to claim 6, wherein a secondary catalyst support (20) is located at a lower end of said secondary catalyst tube (19) spaced downwardly from the lower end of said jacket tube (10).

* * * * *